Patented May 1, 1923.

1,453,457

UNITED STATES PATENT OFFICE.

FRANK M. HALDEMAN, OF CLEVELAND, OHIO, ASSIGNOR TO THE MASTER BUILDERS COMPANY, OF CLEVELAND, OHIO, A CORPORATION OF OHIO.

PROCESS AND COMPOSITION OF MATTER FOR COLORING MORTARS.

No Drawing.   Application filed July 1, 1921.   Serial No. 481,968.

*To all whom it may concern:*

Be it known that I, FRANK M. HALDEMAN, a citizen of the United States, residing at Cleveland, in the county of Cuyahoga and State of Ohio, have invented a certain new and useful Improvement in Processes and Composition of Matter for Coloring Mortars, of which the following is a full, clear, and exact description.

This invention relates to the coloring of mortars in which term I include all compositions based upon lime, natural cement or Portland cement which are mixed up with water and subsequently harden into a solid mass, whether used for binding other materials together or for facing interior or exterior walls or floors. The objects of the invention are the provision of a composition of matter and process whereby the finished structure can be given a bright and uniform color of any desired hue, and this not only without decreasing of its strength, but in fact with a decided acceleration in its setting and a decrease in its porosity; the provision of a process whereby the desired results can be obtained by the use of a much smaller amount of pigment than heretofore and by which many pigments heretofore unavailable can be used and many shades heretofore unavailable can be secured; the provision of a new composition of matter for coloring cement and mortar structures; while further objects and advantages of the invention will become apparent as the description proceeds.

Heretofore it has been the almost universal practice when mortars or concrete were to be colored, to mix a roughly ground pigment with the aggregate and other solid ingredients in the dry state, after which the whole mass was wetted with water in the same way as though no coloring were employed. In order to secure any noticeable shade a very large amount of pigment was required and inasmuch as this was seldom or never mixed uniformly with the other ingredients the color was frequently streaky. In addition this large amount of foreign matter materially decreased the strength of the structure, while the chemical action of the ingredients due to the alkaline nature of the composition destroyed nearly all colors excepting the metallic oxides so that only a few shades were practically available.

I have discovered that if, instead of mixing the dry pigment with the solid ingredients, it be first ground in water to an impalpable fineness and then suspended in the water to be employed in wetting the mixture, the desired coloring can be secured with a very much smaller amount of pigment and in a very much more uniform manner, and furthermore the colors so obtained will be and remain especially bright and permanent in case a quantity of calcium chloride be dissolved in the liquid. This calcium chloride has the property of facilitating the floating or troweling of the plastic composition by reason of preventing segregation of the pigment, whereas in the absence of the calcium chloride the pigment frequently sticks to the tools in a very objectionable way. Also the presence of calcium chloride reduces the destructive effect of the ingredients upon the pigment and enables the employment of a great many coloring materials never heretofore available for this purpose. For example I can use Prussian blue for blue, certain chrome yellows and greens, and in addition I find I can employ with success practically the entire range of aniline colors, provided I first fix the dye upon some insoluble base such as "green earth" or kieselguhr.

In order to facilitate the commercial use of my invention I preferably prepare these colors in the paste form by grinding or mixing the same with a strong aqueous solution of calcium chloride. In addition to the beneficial effects which I have heretofore described, this calcium chloride has the vitally important effect upon the paste of preventing all settling, hardening, caking, or drying out, whereas in the absence of this material the ground pigment rapidly settles and solidifies into a hard, worthless mass, particularly if the container be left uncovered for a few hours as is certain to be the case on a construction job; when calcium chloride is used, however, its hydroscopic nature absolutely inhibits the drying of the material, at least under all ordinary climatic conditions, so that the substance retains for a long time the appearance, feeling, and consistency of white lead ground in oil, and when mixed with water disintegrates almost instantly into a uniform colored liquid wherein the pigment remains in suspension a very considerable time.

I know of no substance other than calcium chloride which will exert this beneficial action upon the paste without injury to the resulting structure; and I know of no other material which will benefit such lime and cement mixture without having an injurious effect upon the paste. I do not limit myself to any specific concentration although I find a solution of calcium chloride having a specific gravity of 1.25 to 1.37 to have an excellent strength for use in the grinding or mixing operation. The weaker solution is preferably for summer use as its effect, when mixed in the wetting liquid to the requiste quantity is to produce the beneficial action mentioned without an undue acceleration of the setting; the stronger solution is preferable for winter use when the acceleration effect is less pronounced, this being the strongest solution which will not crystallize in the cold.

As to the pigments employed I do not limit myself to the particular pigments named since almost any insoluble mineral pigment can be used. Vegetable and animal dyes are mostly unavailable by reason of their solubility, and the effect of acid and alkali thereon. Thus logwood, indigo, turmeric, litmus, and cochineal are unavailable. I consider green earth or like base dyed with aniline or the like coloring matter as an insoluble mineral pigment. I do not exclude the use of other substances in the composition for example the soaps of various fatty acids for waterproofing the concrete, or other substances employed for special purposes, but limit myself only as recited in the annexed claims and include in my invention all processes and compositions except as so recited or as limited by the prior art.

Having thus described my invention what I claim is:

1. The art of coloring cement mortar which contains the step of mixing a finely ground insoluble mineral pigment with the water used in making the mortar, and incorporating such water with the cement and aggregate prior to the settling of the pigment, the quantity of such water being sufficient to produce the desired wetting of the mixture.

2. The art of coloring mortar which contains the step of wetting the ingredients with a solution of calcium chloride having a finely ground insoluble mineral pigment suspended therein.

3. The art of coloring mortar which contains the steps of first grinding an insoluble mineral pigment to an impalpable fineness, making a paste thereof with water and calcium chloride, mixing such paste with a larger quantity of water, and wetting therewith a mixture of cementitious material and aggregate.

4. A composition of matter for coloring mortar containing an insoluble pigment, calcium chloride, and water.

5. A composition of matter for coloring mortar consisting of an insoluble mineral pigment ground in calcium chloride solution to an impalpable fineness and a pasty consistency.

6. A composition of matter consisting essentially of an insoluble mineral pigment, calcium chloride, and water in paste form.

In testimony whereof, I hereunto affix my signature.

FRANK M. HALDEMAN.